(12) United States Patent
Christie

(10) Patent No.: US 6,247,107 B1
(45) Date of Patent: *Jun. 12, 2001

(54) CHIPSET CONFIGURED TO PERFORM DATA-DIRECTED PREFETCHING

(75) Inventor: David S. Christie, Austin, TX (US)

(73) Assignee: Advanced Micro Devices, Inc., Sunnyvale, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/055,649

(22) Filed: Apr. 6, 1998

(51) Int. Cl.$^7$ ...................................................... G06F 12/00
(52) U.S. Cl. ........................... 711/216; 711/218; 711/220; 711/137
(58) Field of Search .................................... 711/216, 217, 711/218, 219, 220, 137

(56) References Cited

U.S. PATENT DOCUMENTS

| | | | |
|---|---|---|---|
| 4,888,679 | * 12/1989 | Fossum et al. ............................ | 712/6 |
| 5,361,391 | * 11/1994 | Westberg ................................ | 711/137 |
| 5,537,573 | * 7/1996 | Ware et al. ............................. | 711/137 |
| 5,652,858 | 7/1997 | Okada et al. . | |
| 5,721,865 | * 2/1998 | Shintani et al. ........................ | 712/207 |
| 5,732,243 | * 3/1998 | McMahan ............................... | 711/137 |
| 5,881,303 | * 3/1999 | Hagersten et al. ....................... | 712/30 |
| 5,918,246 | * 6/1999 | Goodnow et al. ....................... | 711/137 |
| 5,937,175 | * 8/1999 | Sescila, III et al. ................... | 710/129 |
| 5,940,857 | * 8/1999 | Nakanishi et al. ..................... | 711/137 |
| 5,941,981 | * 8/1999 | Tran ..................................... | 712/207 |
| 5,948,100 | * 9/1999 | Hsu et al. .............................. | 712/238 |
| 5,983,319 | * 11/1999 | Ito ....................................... | 711/113 |

OTHER PUBLICATIONS

PowerPC™ Microprocessor Developer's Guide, pp. 212–213, published 1995 by SAMS Publishing, Indianapolis, Indiana.

* cited by examiner

Primary Examiner—Matthew Kim
Assistant Examiner—Fred F. Tzeng
(74) Attorney, Agent, or Firm—Conley, Rose & Tayon, PC; Lawrence J. Merkel (57) ABSTRACT

A chipset is configured to communicate between one or more processors and other components of the computer system, including a main memory. The chipset communicates read memory operations initiated by the processors to the main memory, and returns the data provided therefrom to the processors. Additionally, the chipset includes circuitry configured to select a portion of the data and to generate a prefetch address using the data. Accordingly, a pointer included in the data can be used to generate a prefetch address. The prefetching does not rely on observing the data access pattern. Instead, the data being transferred in response to a memory operation is used to generate a prefetch address (i.e. "data-directed prefetching"). In one embodiment, various programmable features are included in the chipset to specify which portion of the data to select, when to perform prefetching, etc. Accordingly, the prefetching mechanism is flexible to adapt to a variety of data structures and patterns of access to those data structures. By implementing the data-directed prefetching algorithm in the chipset, the data can be selected and a prefetch address generated early in the performance of the memory operation. Accordingly, the effective memory latency of the prefetched data may be substantially reduced due to the early initiation of the prefetch operation.

20 Claims, 5 Drawing Sheets

CHIPSET CONFIGURED TO PERFORM DATA-DIRECTED PREFETCHING

BACKGROUND OF THE INVENTION

1. Field of the Invention

This invention relates to the field of computer systems and, more particularly, to prefetching mechanisms for reducing effective memory latency within computer systems.

2. Description of the Related Art

Superscalar microprocessors achieve high performance by executing multiple instructions per clock cycle and by choosing the shortest possible clock cycle consistent with the design. On the other hand, superpipelined microprocessor designs divide instruction execution into a large number of subtasks which can be performed quickly, and assign pipeline stages to each subtask. By overlapping the execution of many instructions within the pipeline, superpipelined microprocessors attempt to achieve high performance.

Superscalar microprocessors demand low memory latency due to the number of instructions attempting concurrent execution and due to the increasing clock frequency (i.e. shortening clock cycle) employed by the superscalar microprocessors. Many of the instructions include memory operations to fetch (read) and update (write) memory operands. The memory operands must be fetched from or conveyed to memory, and each instruction must originally be fetched from memory as well. Similarly, superpipelined microprocessors demand low memory latency because of the high clock frequency employed by these microprocessors and the attempt to begin execution of a new instruction each clock cycle. It is noted that a given microprocessor design may employ both superscalar and superpipelined techniques in an attempt to achieve the highest possible performance characteristics.

Microprocessors are often configured into computer systems which have a relatively large, relatively slow main memory. Typically, multiple dynamic random access memory (DRAM) modules comprise the main memory system. The large main memory provides storage for a large number of instructions and/or a large amount of data for use by the microprocessor, providing faster access to the instructions and/or data than may be achieved from a disk storage, for example. However, the access times of modern DRAMs are significantly longer than the clock cycle length of modern microprocessors. The memory access time for each set of bytes being transferred to the microprocessor is therefore long. Accordingly, the main memory system is not a high bandwidth, low latency system. Microprocessor performance may suffer due to the high memory latency.

In order to allow low latency memory access (thereby increasing the instruction execution efficiency and ultimately microprocessor performance), computer systems typically employ one or more caches to store the most recently accessed data and instructions. Additionally, the microprocessor may employ caches internally. A relatively small number of clock cycles may be required to access data stored in a cache, as opposed to a relatively larger number of clock cycles required to access the main memory.

Low effective memory latency may be achieved in a computer system if the cache hit rates of the caches employed therein are high. An access is a hit in a cache if the requested data is present within the cache when the access is attempted. On the other hand, an access is a miss in a cache if the requested data is absent from the cache when the access is attempted. Cache hits are provided to the microprocessor in a small number of clock cycles, allowing subsequent accesses to occur more quickly as well and thereby decreasing the memory latency. Cache misses require the access to receive data from the main memory, thereby increasing the memory latency.

In order to increase cache hit rates, computer systems may employ prefetching to "guess" which data will be requested by the microprocessor in the future. The term prefetch, as used herein, refers to transferring data (e.g. a cache line) into a cache prior to a request for the data being generated via instruction execution. A "cache line" is a contiguous block of data which is the smallest unit for which a cache allocates and deallocates storage. If the prefetched data is later accessed by the microprocessor, then the cache hit rate may be increased due to transferring the prefetched data into the cache before the data is requested.

Unfortunately, prefetch algorithms employed by microprocessors are generally very simple algorithms which observe the pattern of memory accesses during execution of a program and attempt to prefetch addresses during that execution based on the observed pattern. For example, stride-based prefetch algorithms have been employed in which the difference between consecutive memory accesses (the "stride") is calculated and used to generate prefetch addresses. These simple prefetch algorithms may not handle a large portion of the memory access patterns which may be exhibited by programs. Particularly, data memory access patterns may not be handled well by simple prefetch algorithms. Generally, only data memory access patterns having a highly regular pattern which can be characterized by one or a small number of values (e.g. strides) are prefetched accurately, and other patterns exhibit varying degrees of prefetch inaccuracy. Inaccurate prefetching consumes memory bandwidth which may be needed by the other memory operations, and may increase cache miss rates by dislodging data from the cache which may later be accessed in response to the program to store data which may not later be accessed in response to the program.

One data memory access pattern which is particularly difficult to prefetch accurately is a pattern in which the data read in response to a first memory operation specifies the address of a subsequent access. A variety of data structures employed by programmers may exhibit this behavior. For example, a linked list data structure comprises elements including a data storage (which stores the data assigned to the element) and a next element pointer storage (which stores a pointer, i.e. an address, to the next element in the list). Traversing the list therefore comprises reading each element in the list to obtain the pointer to the next element. A data structure involving a variety of data storage elements (e.g. a "struct" data structure as defined in the "C" programming language) may include pointers to areas of memory (e.g. a pointer to an array). Accessing the array therefore includes accessing the data structure to obtain the pointer to the array, and then accessing the pointer address (or an offset therefrom). Data access patterns in which the data read specifies the next data to be read are referred to herein as "pointer chasing" patterns.

Prefetching pointer chasing patterns accurately is difficult because the pointers can specify addresses which have no simple mathematical relationship to each other and because a prior memory operation must be completed in order to generate the address for the next memory operation. A method for prefetching pointer chasing patterns accurately and which reduces effective memory latency is therefore desirable.

SUMMARY OF THE INVENTION

The problems outlined above are in large part solved by a computer system employing a chipset in accordance with the present invention. The chipset is configured to communicate between one or more processors and other components of the computer system, including a main memory. The chipset communicates read memory operations initiated by the processors to the main memory, and returns the data provided therefrom to the processors. Additionally, the chipset includes circuitry configured to select a portion of the data and to generate a prefetch address using the data. Accordingly, a pointer included in the data can be used to generate a prefetch address. Advantageously, prefetching of pointer chasing data access patterns may be achievable within the chipset. The prefetching does not rely on observing the data access pattern. Instead, the data being transferred in response to a memory operation is used to generate a prefetch address (i.e. "data-directed prefetching"). When fetching data including pointers to subsequent data to be fetched, the chipset may provide an accurate prefetching mechanism. In one embodiment, various programmable features are included in the chipset to specify which portion of the data to select, when to perform prefetching, etc. Accordingly, the prefetching mechanism is flexible to adapt to a variety of data structures and patterns of access to those data structures.

By implementing the data-directed prefetching algorithm in the chipset, the data can be selected and a prefetch address generated early in the performance of the memory operation. Accordingly, the effective memory latency of the prefetched data may be substantially reduced due to the early initiation of the prefetch operation. Performance of the computer system may be increased due to the reduced effective memory latency.

Broadly speaking, the present invention contemplates a computer system comprising one or more processors, a memory, and a chipset. The memory is configured to store data for access by the processor. Coupled between the processors and the memory, the chipset is configured to read first data from the memory responsive to a memory operation received from the processors, and is further configured to read second data from the memory responsive to a portion of the first data. The portion of the first data comprises an address identifying the second data within the memory.

The present invention further contemplates a method for prefetching data in a computer system. First data is fetched responsive to a first address provided to a chipset within the computer system. A second address is derived from a portion of the first data within the chipset. Second data is prefetched from the second address. The prefetching is initiated by the chipset.

Moreover, the present invention contemplates a chipset for a computer system, comprising a memory interface logic unit and a prefetch control unit. The memory interface logic unit is configured to communicate with a memory. The memory interface logic unit is configured to read first data responsive to a first address received by the memory interface logic unit. Coupled to the memory interface logic unit, the prefetch control unit is configured to generate a prefetch address responsive to a portion of the first data provided by the memory interface logic unit.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
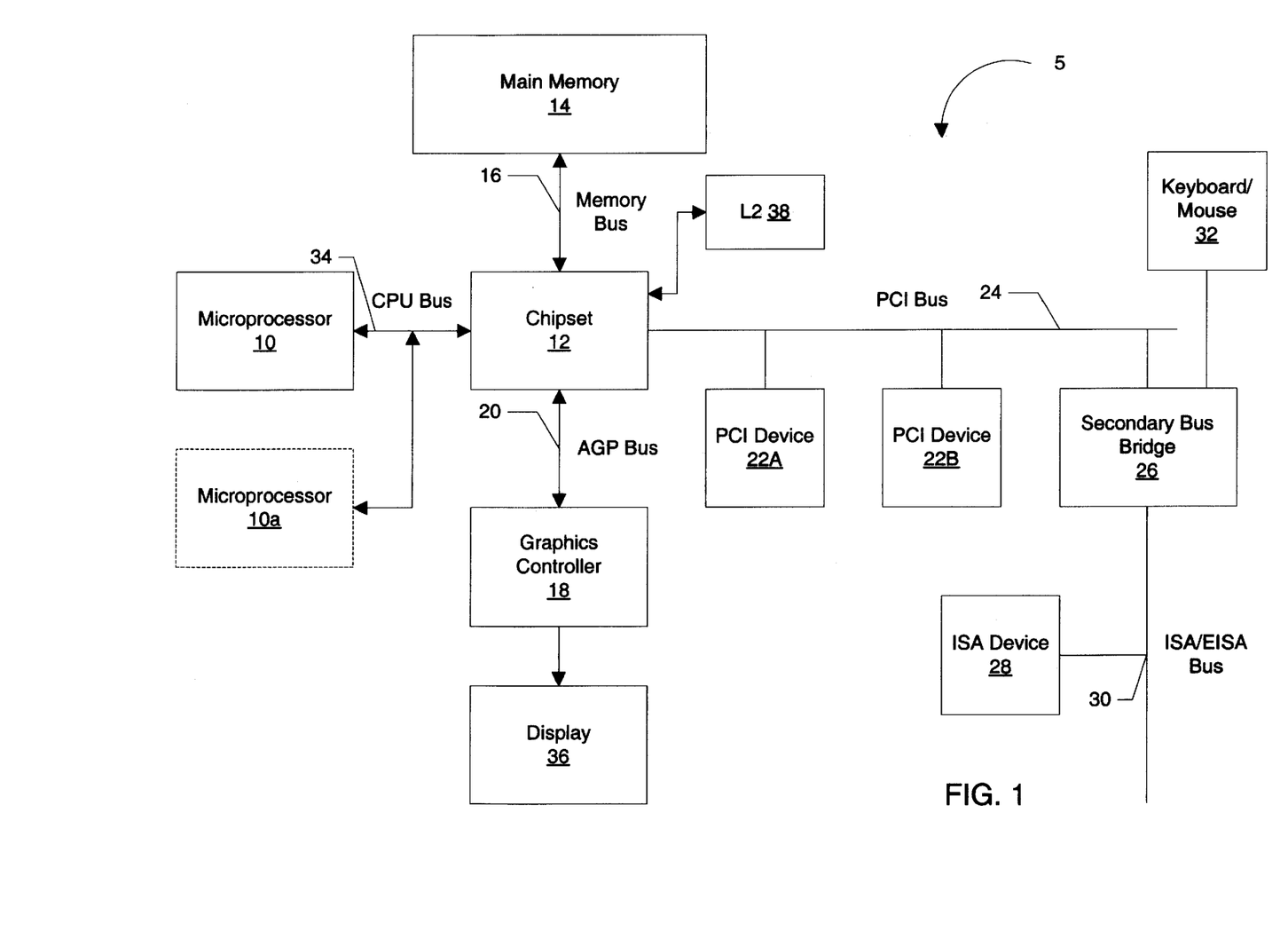
FIG. 1 is a block diagram of one embodiment of a computer system.

Turning now to FIG. 1, a block diagram of one embodiment of a computer system 5 including a microprocessor 10 and an optional second microprocessor 10a coupled to a variety of system components through a chipset 12 is shown. Other embodiments are possible and contemplated. In the depicted system, a main memory 14 is coupled to chipset 12 through a memory bus 16, and a graphics controller 18 is coupled to chipset 12 through an AGP bus 20. An L2 cache 38 is coupled to chipset 12 as well. Finally, a plurality of PCI devices 22A–22B are coupled to chipset 12 through a PCI bus 24. A secondary bus bridge 26 may further be provided to accommodate an electrical interface to one or more EISA or ISA devices 28 through an EISA/ISA bus 30. Microprocessors 10 and 10a are coupled to chipset 12 through a CPU bus 34.

Generally speaking, chipset 12 is configured to receive memory operations from microprocessors 10 or 10a via CPU bus 34. In response to the memory operations, chipset 12 transfers data from main memory 14 (or to main memory 14) according to an address specified by the memory operation. Read memory operations are a transfer of data from main memory 14 to microprocessor 10 or 10a, while write memory operations are a transfer data from a microprocessor to main memory 14. Additionally, chipset 12 is configured to select a portion of the data being read in a read memory operation and to use the selected portion as a prefetch address to prefetch additional data from main memory 14. Chipset 12 may include a variety of control registers for programming whether or not to perform prefetching, as well as which portion of data read in response to a read memory operation should be selected. Advantageously, a prefetch of data specified by an address within data corresponding to a particular read memory operation may be initiated by chipset 12 in parallel with returning the data to the requesting microprocessor. Because the prefetch is initiated at an earlier point within the performance of the particular read memory operation, effective memory latency may be decreased for the subsequent read memory operation which uses the address specified within the data corresponding to the particular read memory operation. Performance of computer system 5 may thereby be increased when performing pointer-chasing type data memory access patterns.

While microprocessors 10 and/or 10a may request read memory operations of a variety of sizes, often read memory operations are requested having a particular size related to the cache line size employed to microprocessors 10 and/or 10a. For example, memory operations may request the entire cache line size. Alternatively, embodiments of microprocessors 10 and/or 10a may employ a sectored cache in which the cache line is divided into sectors, and a sector may be requested via a memory operation. The data corresponding to the read memory operation is generally returned in multiple clock cycles of data transfer across CPU bus 34. The microprocessor requesting a read transfer generally provides (either directly or indirectly) the offset within the cache line of the address which caused the microprocessor to initiate the read memory operation (the "miss address"). Chipset 12 may be programmable to select the portion of the data corresponding to the read memory operation which is at a constant offset from the miss address. Accordingly, if the address of the read memory operation is the boundary the data structure (or element of the data structure), the pointer within the data structure is located by the constant offset.

The size of the data portion selected as a prefetch address is related to the size of addresses supported by computer system 10. As an illustrative example, microprocessors 10 and/or 10a may be configured to perform read memory operations of 32 bytes in size, and addresses may be 32 bits. Accordingly, a 32 bit (4 byte) portion may be selected by chipset 12 from the 32 bytes transferred in response to a read memory operation.

As used herein, the term "chipset" refers to one or more integrated circuits which support the integration of processors, e.g. microprocessors 10 and/or 10a, into a computer system such as computer system 5. The chipset provides communication facilities between the processors and other components of the computer system. The term "processor" refers to a device which executes a predefined instruction set. The predefined instruction set may be part of a processor architecture such as, for example, the x86 architecture, the PowerPC architecture, the Alpha architecture, etc. In one particular embodiment, microprocessors 10 and 10a employ the x86 architecture.

Chipset 12 provides an interface between microprocessor 10, main memory 14, graphics controller 18, L2 cache 38, and devices attached to PCI bus 24. When an operation is received from one of the devices connected to chipset 12, chipset 12 identifies the target of the operation (e.g. a particular device or, in the case of PCI bus 24, that the target is on PCI bus 24). Chipset 12 routes the operation to the targeted device. In the case of a memory access, chipset 12 checks for a hit in L2 cache 38 prior to or in parallel with accessing main memory 14 via memory bus 16. L2 cache 38 provides lower latency access to data/instructions stored therein as compared to main memory 14. Typically, as data/instruction bytes are transferred to microprocessor 10, the data is also stored in L2 cache 38 on the assumption that the data may be accessed again. L2 cache 38 is referred to as "L2" because microprocessor 10 may also employ an internal cache. Chipset 12 generally translates an operation from the protocol used by the source device or bus to the protocol used by the target device or bus.

In addition to providing an interface to an ISA/EISA bus for PCI bus 24, secondary bus bridge 26 may further incorporate additional functionality, as desired. For example, in one embodiment, secondary bus bridge 26 includes a master PCI arbiter (not shown) for arbitrating ownership of PCI bus 24. An input/output controller (not shown), either external from or integrated with secondary bus bridge 26, may also be included within computer system 5 to provide operational support for a keyboard and mouse 32 and for various serial and parallel ports, as desired.

Main memory 14 is a memory in which application programs are stored and from which microprocessor 10 primarily executes. A suitable main memory 14 comprises DRAM (Dynamic Random Access Memory), and preferably a plurality of banks of SDRAM (Synchronous DRAM).

PCI devices 22A–22B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 28 is illustrative of various types of peripheral devices, such as a modem, a sound card, and a variety of data acquisition cards such as GPIB or field bus interface cards.

Graphics controller 18 is provided to control the rendering of text and images on a display 36. Graphics controller 18 may embody a typical graphics accelerator generally known in the art to render three-dimensional data structures which can be effectively shifted into and from main memory 14. Graphics controller 18 may therefore be a master of AGP bus 20 in that it can request and receive access to a target interface within chipset 12 to thereby obtain access to main memory 14. A dedicated graphics bus accommodates rapid retrieval of data from main memory 14. For certain operations, graphics controller 18 may further be configured to generate PCI protocol transactions on AGP bus 20. The AGP interface of chipset 12 may thus include functionality to support both AGP protocol transactions as well as PCI protocol target and initiator transactions. Display 36 is any electronic display upon which an image or text can be presented. A suitable display 36 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 5 may be a multiprocessing computer system including additional microprocessors (e.g. microprocessor 10a shown as an optional component of computer system 5). Microprocessor 10a may be similar to microprocessor 10. More particularly, microprocessor 10a may be an identical copy of microprocessor 10. Microprocessor 10a may share CPU bus 34 with microprocessor 10 (as shown in FIG. 1) or may be connected to chipset 12 via an independent bus.

Figure 2:
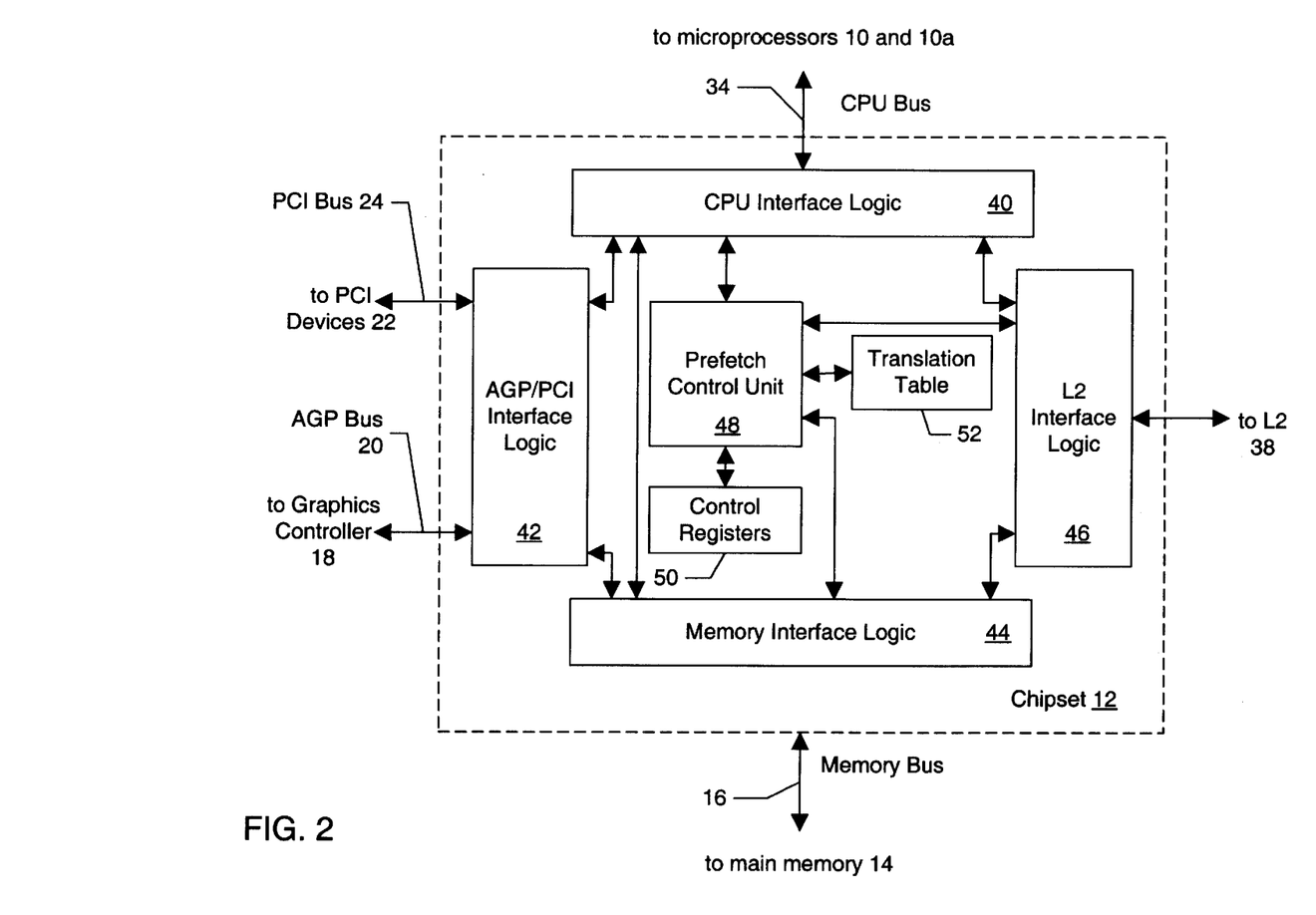
FIG. 2 is a block diagram of one embodiment of a chipset shown in FIG. 1

Turning now to FIG. 2, a block diagram of one embodiment of chipset 12 is shown. Other embodiments are possible and contemplated. In the embodiment of FIG. 2, chipset 12 includes a CPU interface logic unit 40, an AGP/PCI interface logic unit 42, a memory interface logic unit 44, an L2 interface logic unit 46, a prefetch control unit 48, a set of control registers 50, and a translation table 52. CPU interface logic unit 40 is coupled to CPU bus 34, prefetch control unit 48, memory interface logic unit 44, AGP/PCI interface logic unit 42, and L2 interface logic unit 46. AGP/PCI interface logic unit 42 is further coupled to memory interface logic unit 44, AGP bus 20, and PCI bus 24. Memory interface logic unit 44 is further coupled to memory bus 16, prefetch control unit 48, and L2 interface logic unit 46. L2 interface logic unit 46 is further coupled to L2 cache 38 and prefetch control unit 48. Translation table 52 and control registers 50 are coupled to prefetch control unit 48.

Prefetch control unit 48 is configured to monitor read memory operations received from CPU interface logic unit 40. According to prefetch parameters programmed into control registers 50, prefetch control unit 48 determines whether or not a prefetch is to be initiated in response to a memory operation received by CPU interface logic unit 40. If prefetch control unit 48 determines that a prefetch is to be initiated, prefetch control unit 48 selects a portion of the data provided by memory interface logic unit 44 in response to the read memory operation and generates a prefetch address therefrom. Prefetch control unit 48 then conveys the prefetch address to memory interface logic unit 44. Memory interface logic unit 44 fetches the data corresponding to the prefetch address.

In the embodiment shown, chipset 12 is configured to be included in a computer system with processors which employ an address translation mechanism. For example, the x86 architecture specifies an address translation mechanism in which a logical address generated in response to instruction execution is first translated into a linear address via a segmentation mechanism and then into a physical address within main memory 14 via a page translation mechanism. In many cases, the segmentation mechanism is effectively disabled by operating in a flat addressing mode in which the logical and linear addresses are equal. For the remainder of this discussion, flat addressing mode will be assumed and addresses prior to translation will be referred to as linear addresses. However, any suitable address translation mechanism may be employed in various embodiments.

Generally, instruction sequences are executed with address translation enabled. Accordingly, the addresses generated for memory operations are linear addresses. Therefore, the pointers stored in various data structures are linear address pointers. When prefetch control unit 48 selects a portion of data being returned in response to a read memory operation for use as a prefetch address (because the portion is actually a pointer), the portion of data is a linear address. In order to fetch data from main memory 14, the physical addresses are used and the linear address is translated. Prefetch control unit 48 employs translation table 52 to translate from linear to physical addresses. Prefetch control unit 48 may employ the same address translation mechanism as the processors within the computer system for which chipset 12 is designed uses. In one embodiment, translation table 52 may be similar to the graphics address relocation table (GART table) as defined in the AGP specification.

In an alternative embodiment, prefetch control unit 48 may omit address translation logic and instead assume that the prefetch address lies within the same page as the address corresponding to the read memory operation received by CPU interface logic unit 40. In such an embodiment, prefetch control unit 48 may concatenate the page portion of the address received by CPU interface logic unit 40 with the page offset portion of the linear address selected from the data read in response to that read memory operation. Such an embodiment may eliminate translation table 52.

As used herein, the term "page" refers to a block of contiguous memory locations which share the same address translation. In other words, a page is the unit of allocation and deallocation of address translations. The "page portion" of an address is the portion which is modified according to the address translation mechanism. The "page offset portion" or "page offset" refers to the portion of the address which identifies the offset within the page (and hence is not modified by the address translation mechanism). A page may be of any size. For example, the x86 architecture specifies 4 KB pages aligned to 4 KB address boundaries. Recent additions the x86 architecture also include a page size of up to 4 MB, if desired. Generally, an "address translation" refers to modification of an address from one representation to another representation according to a predefined algorithm.

Prefetch control unit 48 may be further configured to select a portion of the data prefetched in response to a prefetch address generated by prefetch control unit 48, and generate a prefetch address from that selected portion in a manner similar to generation of the prefetch address from data corresponding to a read memory operation received by CPU interface logic unit 40. In one embodiment, prefetch control unit 48 is configured to use the identical method for locating the portion to be selected from either prefetch data corresponding to a prefetch address or data corresponding to a read memory operation. Control registers 50 may be programmable to indicate the number of times the prefetch address should be generated from data corresponding to a previously generated prefetch address. In this fashion, multiple entries of a linked list data structure, for example, may be prefetched by prefetch control unit 48.

Prefetch control unit 48 may still further be configured, when generating prefetch addresses responsive to portions of prefetch data in an embodiment which does not employ translation table 52, to detect that the linear address selected from a particular prefetch data differs in its page portion from the previous linear prefetch addresses. Prefetch control unit 48, upon detecting such a difference, may be configured to stop prefetching. Alternatively, prefetch control unit 48 may be configured to request a translation from the processors in the computer system.

The prefetch data read from main memory 14 in response to prefetch addresses generated by prefetch control unit 48 may be handled in a variety of fashions. Chipset 12 may employ a prefetch buffer within CPU interface logic unit 40, prefetch control unit 48, or memory interface logic unit 44 for storing the prefetch data and corresponding prefetch address. Upon receiving a memory operation upon CPU bus 34, CPU interface logic unit 40 may compare the received address to the prefetch buffer and return data therefrom if an address match is detected. Alternatively, prefetch data may be loaded into L2 cache 38. A subsequent request for the data received upon CPU bus 34 may then detect a hit in L2 cache 38 (via the typical L2 look up mechanism), and may experience a lower memory latency than if the data were read from main memory 14 in response to the request.

Control registers 50 provide programmability to the prefetch function employed by chipset 12. Control registers 50 may include an enable setting which enables and disables prefetch control unit 48. The enable setting may comprise, for example, a bit. Control registers 50 may also include a constant offset register which is programmed to store the constant offset to be added to the address of the read memory operation in order to locate the portion of the corresponding data to be used to generate the prefetch address. Control registers 50 may include a memory range register to define the range of memory addresses for which prefetching is to be performed. Still further, control registers 50 may include a repetition count indicating the number of prefetches performed in response to a particular address received by CPU interface logic unit 40. When repetition is performed in the present embodiment, each prefetch address is generated from the immediate previously fetched data (i.e. the first prefetch address is generated from the data corresponding to the read memory operation and subsequent prefetch addresses are generated from the immediately prefetched data). Still further, a control register may be include for programming a variable page size for those embodiments of processors which employ variable page sizes (e.g. 4 KB up to 4 MB in the x86 architecture) Other control registers providing additional programmability or functionality may be included as desired as well.

Prefetch control unit 48 may be further configured to perform a coherency check to ensure that prefetch data from main memory 14 is the most up-to-date copy of that data. Generally, the term "coherency" refers to determining which of multiple copies of a particular datum represents the current state of that datum. For example, various processors in a computer system with chipset 12 may employ internal caches which may retain a copy of data prefetched by prefetch control unit 48. Furthermore, L2 cache 38 may store a copy of the prefetch data as well. Prefetch control unit 48 may interrogate L2 cache 38 to determine if L2 cache 38 is storing a copy of the data to be prefetched, and may inhibit the prefetch if a hit is detected in L2 cache 38. If two or more processors are connected to CPU bus 34, prefetch control unit 48 may be configured to initiate a coherency interrogation on CPU bus 34 as well. Alternatively, prefetch control unit 48 may rely on coherency mechanisms between the processors (if such coherency mechanisms are employed) to ensure the coherency of the prefetch data. In other words, prefetch control unit 48 may prefetch data and, if a request for that data upon CPU bus 34 causes a device connected to CPU bus 34 to perform a coherency action (such as a copy back to memory), the prefetch data may be discarded at that point in favor of the updated copy provided via the coherency action.

In another embodiment, prefetch control unit 48 may not employ any coherency mechanism. Software executing within computer system 5 may be required to maintain coherency for such an embodiment. For example, if the software is programming prefetch control unit 48 via control registers 50 to perform prefetching, the software can ensure that no updates to data that may be prefetched are stored in the caches.

Logic units 40, 42, 44, and 46 are each configured to interface with the buses which they are connected and to communicate with the other logic units in order to complete operations received upon those buses. Logic units 40, 42, 44, and 46 may employ a variety of queues for operations as desired. It is noted that various embodiments of L2 interface logic 46 may include the address tags for L2 cache 38 or may store the address tags within the memory forming L2 cache 38.

It is noted that, while prefetch control unit 48 monitors CPU memory operations as described above and uses data fields from the corresponding data to generate prefetch addresses, other embodiments are contemplated in which memory operations initiated other than upon CPU bus 34 are monitored for prefetching purposes. For example, embodiments may monitor operations initiated upon AGP bus 20 or PCI bus 24 for data-directed prefetching purposes.

Figure 3:
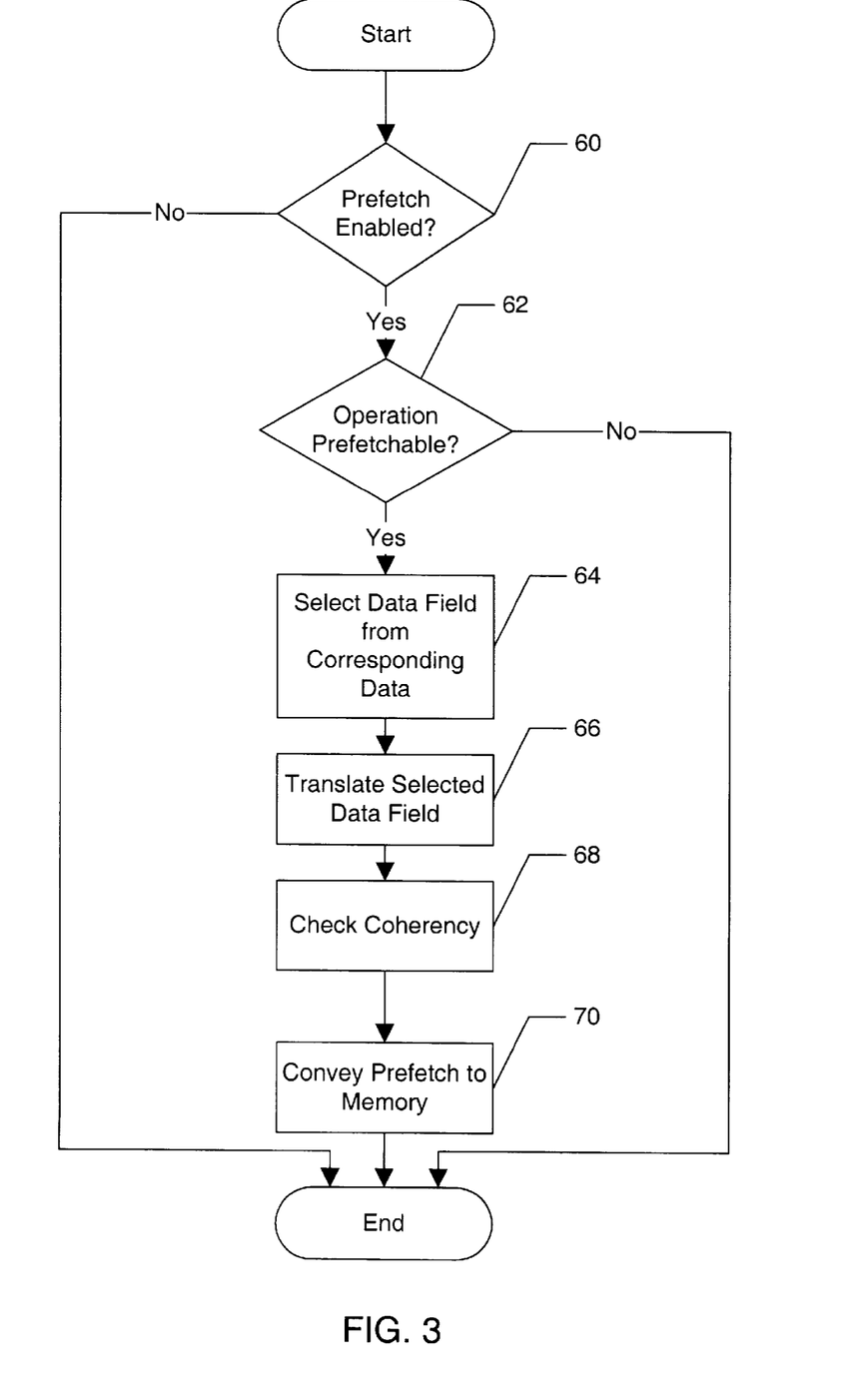
FIG. 3 is a flowchart illustrating operation of one embodiment of a prefetch control unit within the chipset shown in FIG. 2.

Turning now to FIG. 3, a flowchart illustrating operation of one embodiment of prefetch control unit 48 upon receiving a read memory operation from CPU interface logic unit 40 is shown. Similar operations may be performed upon performing a prefetch if prefetch iteration is desired. Other embodiments are possible and contemplated. Although one or more steps within the flowchart shown in FIG. 3 are illustrated in a serial order for ease of understanding, any suitable order may be used. Furthermore, circuitry employed within prefetch control unit 48 may perform portions of the steps in parallel as desired.

Prefetch control unit 48 determines if prefetch is enabled by examining the enable indication stored in control registers 50 (decision block 60). If prefetch is not enabled, prefetch control unit 48 takes no action with respect to the read memory operation. On the other hand, if prefetching is enabled, prefetch control unit 48 determines if the received read memory operation is prefetchable (decision block 62). A variety of factors may affect the determination of whether or not a memory operation is prefetchable. For example, if a memory operation is indicated as non-cacheable via its encoding upon CPU bus 34, prefetch control unit 48 may determine the operation is not prefetchable. In embodiments in which prefetch control unit 48 is programmed with a memory range within which to perform prefetching, prefetch control unit 48 may determine whether or not a memory operation is prefetchable by determining whether or not the address corresponding to the operation is within the range. In yet another embodiment, the processors within the computer system with chipset 12 may be configured to indicate, via different encodings upon CPU bus 34, whether or not a particular memory operation is prefetchable. Still further, a previously generated prefetch may itself be prefetchable if prefetch iteration has been selected via control registers 50.

If a memory operation is determined to be prefetchable, prefetch control unit 48 awaits receipt of the data corresponding to the memory operation. Upon receipt of the data, prefetch control unit 48 selects a data field from the data (step 64). As described above, the selected data field may be identified in a variety of fashions. For example, a constant offset from the miss address may be programmed into control registers 50, and may identify the selected field. The selected data field is then translated (step 66). As described above, a variety of translation methods may be used. For example, translation table 52 may be used or prefetch control unit 48 may concatenate the page portion of the address of the memory operation with the page offset portion of the data field selected from the data corresponding to the memory operation. Prefetch control unit 48 may check for coherency with respect to the generated prefetch address (step 68) and then may convey the generated prefetch address to memory or face logic unit 44 for prefetch from main memory 14 (step 70).

Figure 4:
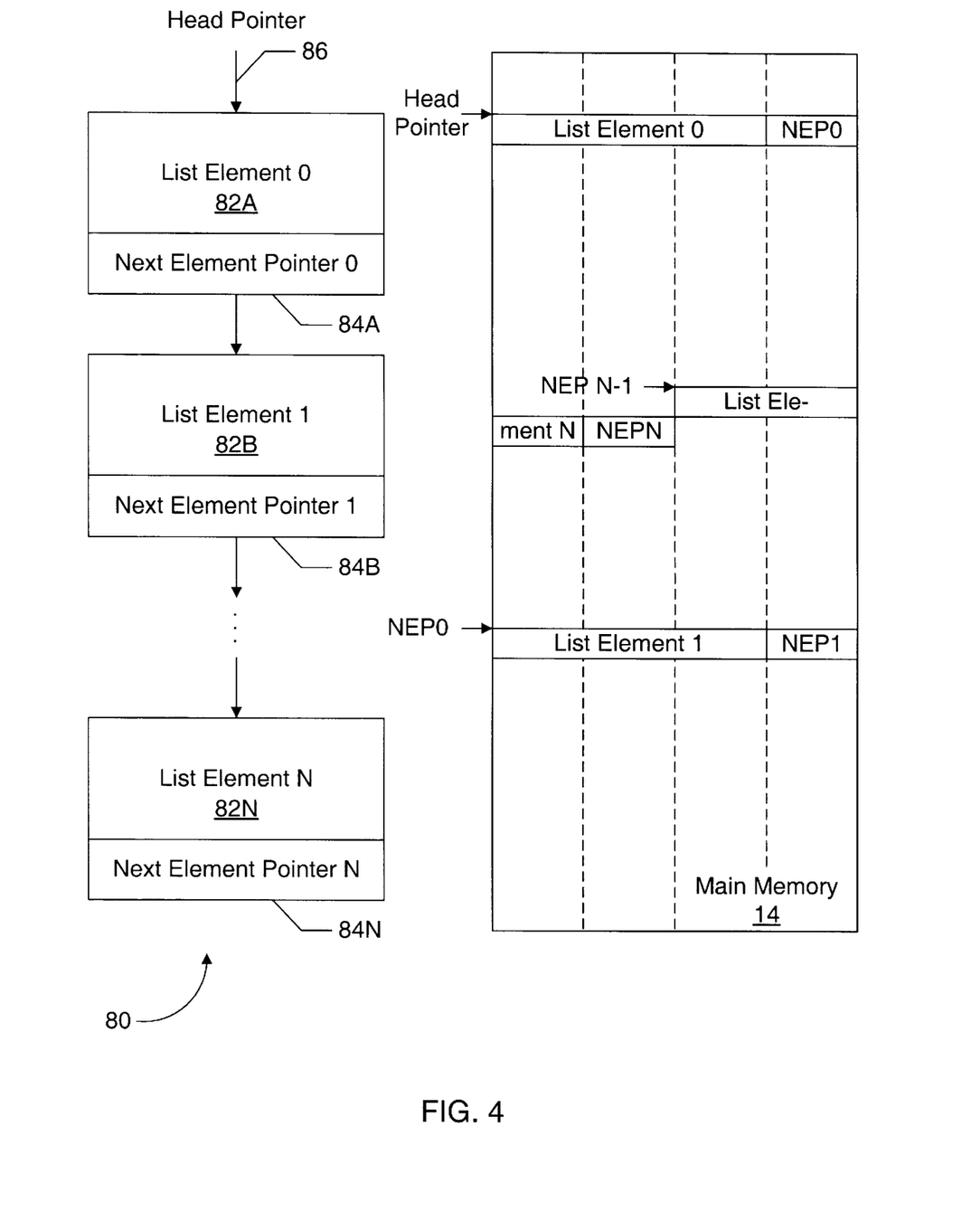
FIG. 4 is a diagram illustrating an exemplary link list data structure and its storage in memory.

Turning now to FIG. 4, an exemplary linked list data structure 80 is shown. Linked list structure 80 includes a plurality of list elements 82A–82N and a corresponding plurality of next element pointers 84A–84N. Each of list elements 82A–82N are configured to store one or more values according to the definition of the linked list data structure. Each next element pointer 84A–84N identifies the next element within linked list structure 80. A head pointer 86 identifies the initial element within the list. Accordingly, to traverse linked list structure 80, a read memory operation to the address identified by head pointer 86 is performed. The next element pointer 84A within the initial element 82A is then selected and used as an address for a subsequent read memory operation. Since next element pointer 84A is read as part of read memory operation using the head pointer 86 address, the read memory operation using next element pointer 84A is not initiated by the processor traversing linked list 80 until the read memory operation using head pointer 86 address completes.

Storage locations within main memory 14 are illustrated in FIG. 4 as well. Each vertical dashed line in FIG. 4 separates a four byte storage location for this example. Accordingly, 16 bytes are illustrated by each row within main memory 14 as shown in FIG. 4. For clarity in the drawing, not all rows are shown within main memory 14. Only rows including portions of linked lists 80 are shown. The pointers to each element are illustrated as arrows to storage locations within main memory 14. Accordingly, the head pointer identifies the storage locations at which list element 82A and corresponding next element pointer 84A are stored. Similarly, next element pointer 84A identifies the storage location at which list element 82B and corresponding next element pointer 84B is stored. The pointer labeled NEP N-1 identifies the storage location at which list element 82N and corresponding next element pointer 84N are stored. Pointer NEP N-1 corresponds to list element (not shown in FIG. 4) which immediately proceeds list element 82N within linked list 80.

As FIG. 4 illustrates, the elements within linked list 80 may be distributed within main memory 14 in a pattern which does not correspond to the order of the elements within linked list 80. Accordingly, a stride based prefetch algorithm would not accurately prefetch reversal of the linked list 80. However, prefetch control unit 48 may be programmed to locate the next element pointer field within each entry in linked list 80. When the read memory operation having head pointer 86 as an address is received, prefetches of the subsequent entries within a list may be generated by prefetch control unit 48 and hence be effective memory latency of the subsequent elements may be reduced.

FIG. 4 further illustrates that, given head pointer 86, next element pointer NEP0 is located as a constant offset from head pointer 86. Similarly, next element pointer NEP1 is located as a constant offset from next element pointer NEP0, etc. It is noted that, if the address generated by the processors for traversing link list 80 already includes the constant offset (i.e. the address of the read memory operation specifies the next element pointer storage locations directly), then the constant offset register provided within control registers 50 may be set to zero. Having the location of the selected data field as a programmable feature provides software flexibility for operating the prefetch mechanism.

An embodiment of prefetch control unit 48 which employs a repetition counter generating prefetch addresses may be particularly useful in prefetching a traversal of linked lists. The first prefetch address would be generated using the portion of the data corresponding to next element pointer 84A, and subsequent prefetch addresses would be generated from the prefetch data of the immediately preceding prefetch.

In yet another embodiment, prefetch control unit 48 may be further programmable to perform a search for a particular list element. Control registers 50 may include a storage location for a value being searched for, and an offset from the address of each element within the structure at which the value should be stored. Head pointer 86 may also be stored into control registers 50, and prefetch control unit 48 may then fetch through the list, comparing the value in control registers 50 with the corresponding value of each element until either a match is found or the end of the list is reached.

Figure 5:
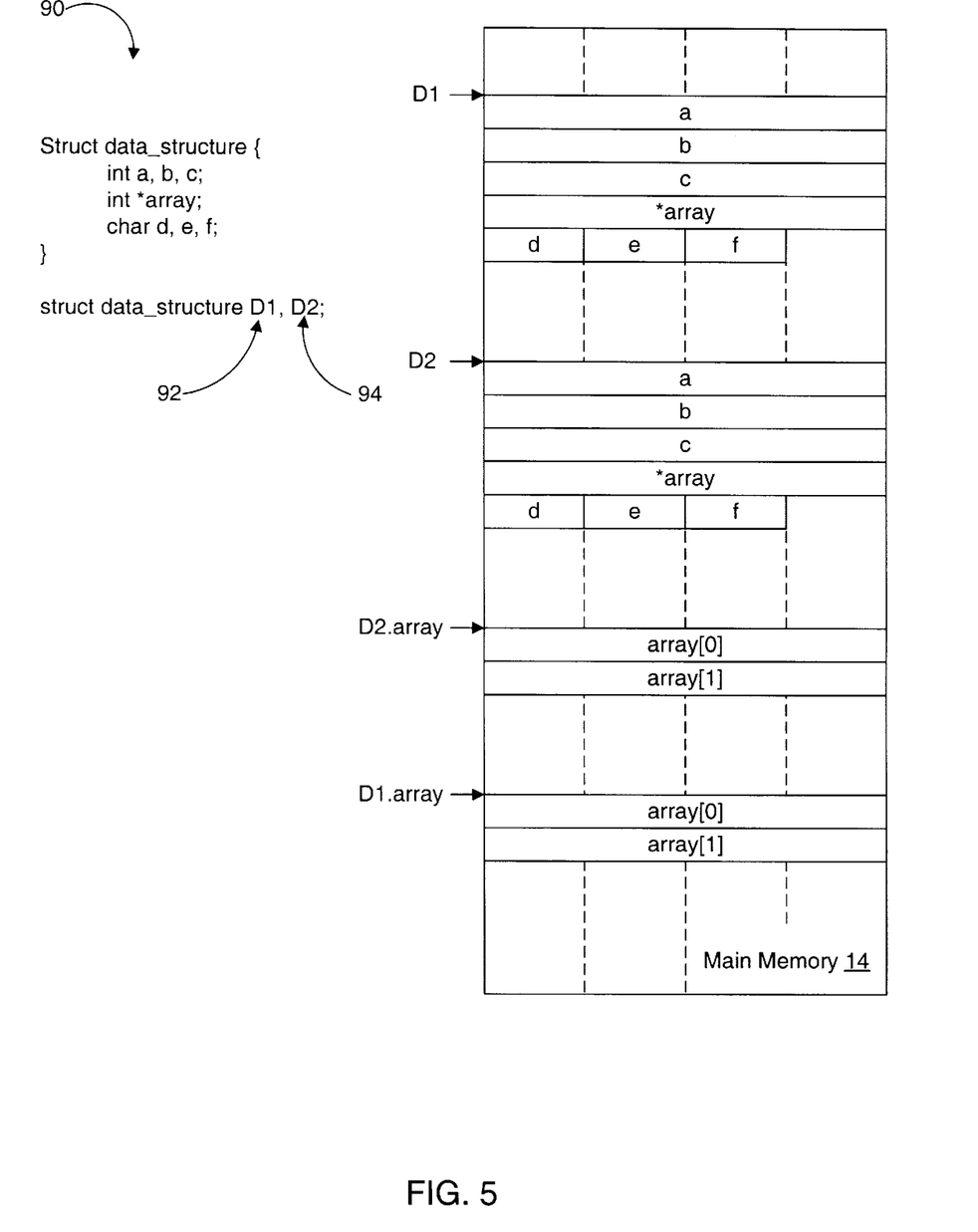
FIG. 5 is a diagram illustrating an exemplary data structure and its storage in memory.

Turning next of FIG. 5, a "struct" data structure 90 as defined in the C programming language is illustrated. Data structure 90 is given a name data_structure. Two instances of data_structure are instantiated as D1 92 and D2 94. Main memory 14 is illustrated in a manner similar to that FIG. 4. For this example, each vertical dashed lines separates a byte of storage. D1 92 is a pointer to a block of memory within main memory 14 at which the elements of the data_structure are stored for the first instantiation of data_structure. Each element is located via a different offset from D1 pointer 92. Similarly, D2 94 is a pointer to another block of memory within main memory 14 the which the elements of the data_structure are stored for the second instantiation of data_structure.

As illustrated in FIG. 5, data_structure 90 includes three integer storage locations (a, b, and c in this example) followed by a pointer to an integer (array in this example) still further followed by three character storage locations (d, e, and f in this example). For this example, integers are assumed to be four bytes. Pointers, which are addresses, are also assumed to be four bytes. Characters are assumed to be one byte.

The first instantiation of data_structure is illustrated within main memory 14, and pointer D1 locates the initial byte within the data structure. Similarly, the second instantiation of data_structure is illustrated within main memory 14, and pointer D2 locates the initial byte within the data structure. Still further, an area within main memory 14 pointed to by the array pointer within the first instantiation of data_structure is illustrated, located by a pointer D1.array. Similarly, an area within main memory 14 pointed to by the array pointer within the second instantiation the data_structure is illustrated, located by a pointer D2.array. The areas of memory pointed to by pointers D1.array and D2.array are illustrated as two element arrays for this example.

In order to access an element within, for example, the array located by pointer D1.array, a read memory operation using pointer D1 as a base address is performed to read the pointer D1.array. The pointer D1.array is then used as a base address to read an element of the corresponding array. Prefetch control unit 48 may be programmed to prefetch using pointer D1.array as a prefetch address in order to reduce the effective memory latency of accesses to the array.

While the example shown in FIG. 5 illustrates only one level of pointer chasing, data structures of the type shown in FIG. 5 may employ any number of levels of pointer chasing to arrive at a desired value. A repetition count could be set to the number of levels in order to reduce the effective memory latency of accesses to the desired values. It is noted that, while FIGS. 4 and 5 provide specific data structure examples, many other data structures may benefit from the prefetching mechanism described herein. For example, structures may contain pointers to any type of data structure, not only arrays.

Another example of the use of prefetching via prefetch control unit 48 may be the index list of triangle vertices used in three dimensional graphics manipulations. The index list is a list of pointers to the vertices, and the order of the pointers within the index list defines the connections between vertices which form the triangles. Accordingly, by reading the index list sequentially, the triangles can be constructed by connecting the indicated vertices. However, while the pointers are read in order from the list, each pointer may indicate a vertex stored in a memory location which has no address relationship to the memory location storing the vertex previously indicated within the list. By selecting each pointer in order as the pointers are provided to the processor and prefetching using the selected pointers as addresses, the vertices may be prefetched by prefetch control unit 48. Effective memory latency to access the vertices may thereby be reduced.

In accordance with the above disclosure, a chipset for a computer system has been shown which selects a portion of data read in response to a read memory operation and generates a prefetch address from the selected data. The prefetch feature may be used, for example, to reduce the effective memory latency of data access patterns which exhibit a pointer chasing pattern. Performance may be increased due to the reduction in average memory latency. By implementing the prefetch feature within the chipset instead of a processor within the computer system, the prefetch may be initiated earlier in the process of completing the read memory operation. In this manner, effective memory latency may be further reduced over algorithms implemented within a processor.

Numerous variations and modifications will become apparent to those skilled in the art once the above disclosure is fully appreciated. It is intended that the following claims be interpreted to embrace all such variations and modifications.

What is claimed is:

1. A computer system comprising:

a processor;

a memory configured to store data for access by said processor; and a chipset coupled between said processor and said memory, wherein said chipset is configured to read first data from said memory responsive to a memory operation received from said processor, and wherein said chipset is further configured to read second data from said memory responsive to a portion of said first data, said portion of said first data comprising an address identifying a location of said second data within said memory, and wherein said chipset is configured to read third data responsive to a portion of said second data, and wherein said portion of said second data is located within said second data identical to a location of said portion of said first data within said first data;

and wherein said processor, if said processor accesses said second data, selects said address of said second data from said portion of said first data, and wherein said processor is configured to transmit a second memory operation to said chipset including said address to access said second data.

2. The computer system as recited in claim 1 wherein said chipset includes one or more control registers, and wherein reading of said second data is selectively enabled via said control registers.

3. The computer system as recited in claim 2 wherein said chipset is programmable, via said control registers, to select one of a plurality of portions of said first data to be said address.

4. The computer system as recited in claim 1 wherein said chipset is configured to translate said portion of said first data to create said address using an address translation mechanism.

5. The computer system as recited in claim 4 wherein said address translation mechanism comprises selecting a page portion of a first address identifying said first data within said memory and concatenating said page portion with a page offset portion of said portion of said first data.

6. The computer system as recited in claim 4 wherein said chipset includes a translation table configured to store translations defined by said address translation mechanism.

7. The computer system as recited in claim 6 wherein said address translation mechanism is identical to an address translation mechanism employed by said processors.

8. The computer system of claim 1, wherein said first data, said second data and said third data each comprise a data element and an address element.

9. A method for prefetching data in a computer system, comprising:

fetching first data responsive to a first address provided to a chipset within said computer system;

selecting a second address from a portion of said first data within said chipset;

prefetching second data corresponding to said second address, said prefetching initiated by said chipset;

selecting said second address from said portion of said first data within a processor coupled to the chipset, the processor accessing the second data using said second address selected from said portion of said first data;

selecting a third address from a portion of said second data within said chipset;

prefetching third data from said third address, said prefetching initiated by said chipset; and locating said portion of said second data identical to locating said portion of said first data.

10. The method as recited in claim 9 further comprising generating said first address within a processor within said computer system.

11. The method as recited in claim 10 further comprising programming said chipset to select said portion of said first data from a plurality of portions of said first data.

12. The method as recited in claim 10 wherein said selecting said second address comprises translating said portion of said first data using a predefined address translation mechanism.

13. The method as recited in claim 12 wherein said translating comprises concatenating a page portion of said first address with a page offset portion of said portion of said first data.

14. The method as recited in claim 12 further comprising translating addresses within one or more processors in said computer system using said address translation mechanism.

15. The method as recited in claim 9 wherein said prefetching said second data comprises checking one or more caches within said computer system for coherency.

16. The method of claim 9, wherein said first data, said second data and said third data each comprise a data element and an address element.

17. A chipset for a computer system, comprising:

a memory interface logic unit configured to communicate with a memory, said memory interface logic unit configured to read first data responsive to a first address received by said memory interface logic unit; and a prefetch control unit coupled to said memory interface logic unit, wherein said prefetch control unit is configured to generate a first prefetch address responsive to a portion of said first data provided by said memory interface logic unit, and wherein said memory interface logic unit is configured to read second data responsive to said first prefetch address, and wherein said prefetch control unit is configured to generate a second prefetch address responsive to a portion of said second data, and wherein said portion of said second data is located within said second data identical to a location of said portion of said first data within said first data.

18. The chipset as recited in claim 17 further comprising one or more control registers coupled to said prefetch control unit, wherein reading of said second data is selectively enabled via said control registers.

19. The chipset as recited in claim 18 wherein said prefetch control unit is programmable, via said control registers, to select one of a plurality of portions of said first data to be said first prefetch address.

20. The chipset as recited in claim 17 wherein said chipset is configured to translate said portion of said first data to create said address using an address translation mechanism.

* * * * *